US012118015B1

(12) United States Patent
Jonsson et al.

(10) Patent No.: US 12,118,015 B1
(45) Date of Patent: Oct. 15, 2024

(54) ADDING HIERARCHY OF OBJECTS WHEN INGESTING AND NORMALIZING DATA FROM HETEROGENEOUS DATA SOURCES

(71) Applicant: Amazon Technologies, Inc., Seattle, WA (US)

(72) Inventors: Jan Henrik Jonsson, Newport Beach, CA (US); Davor Golac, Seattle, WA (US); Shobhit Gupta, Seattle, WA (US); Rajesh Srinivas Wunnava, Torrance, CA (US); Hongtao Liu, San Diego, CA (US); David Andrew Schwardt, Seattle, WA (US); Shadie Hijazi, Seattle, WA (US); Kuangyou Yao, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 260 days.

(21) Appl. No.: 17/491,198

(22) Filed: Sep. 30, 2021

(51) Int. Cl.
*G06F 16/23* (2019.01)
*G06F 16/245* (2019.01)
*G06F 16/25* (2019.01)

(52) U.S. Cl.
CPC ........ *G06F 16/258* (2019.01); *G06F 16/2379* (2019.01); *G06F 16/245* (2019.01)

(58) Field of Classification Search
None
See application file for complete search history.

(56) References Cited

U.S. PATENT DOCUMENTS

| 2011/0125770 A1* | 5/2011 | Battestini | G06Q 10/00 707/758 |
| 2021/0117396 A1* | 4/2021 | Iska | G06N 3/084 |
| 2022/0101161 A1* | 3/2022 | Goel | G06N 20/00 |
| 2022/0121687 A1* | 4/2022 | Tirupati | G06F 16/2379 |

OTHER PUBLICATIONS

Wunnava, Rajesh & Taylor Riggan, "Building A Customer Identity Graph with Amazon Neptune", AWS Database Blog, posted May 12, 2020, 13 pages. (Year: 2020).*
Jonsson et al., U.S. Appl. No. 17/364,389, filed Jun. 30, 2021, 39 pages.

* cited by examiner

*Primary Examiner* — Scott A. Waldron
(74) *Attorney, Agent, or Firm* — Davis Wright Tremaine LLP

(57) ABSTRACT

Systems and methods are described herein relating to ingesting data objects from various sources and associating them in a hierarchy with a profile. In some aspects, a data object, including a set of fields and indicating a data object type, may be obtained for associating with a profile maintained by a computing resource service provider. The data object may be converted into a standardized format based on the data object type indicated in the data object using an object mapping associated with the data object. A key associated with the data object and indicated in the object mapping may be selected and used to search an index for a related profile. Upon finding a profile with the matching key, the profile may be updated to include an association of the standardized data object, such as in a hierarchy.

20 Claims, 8 Drawing Sheets

ADDING HIERARCHY OF OBJECTS WHEN INGESTING AND NORMALIZING DATA FROM HETEROGENEOUS DATA SOURCES

BACKGROUND

A data store service may utilize a collection of programs that enables storage, modification, and extraction of information from a data store. Many different types of data store services exist, ranging from small systems that execute on client devices to large systems that run on server computer systems. Data storage services can differ widely in the types of data that are stored and the ways in which that data is organized within a particular data store service. For example, user data can include order history, call log, contact information, and other structured and unstructured data which might be stored using various relational, flat, or hierarchical techniques. Storing and presenting this heterogeneous user data in a standardized hierarchical way can present challenges when the data comes from various sources that utilize different mapping and formats for the data.

BRIEF DESCRIPTION OF THE DRAWINGS

Various techniques will be described with reference to the drawings, in which.

DETAILED DESCRIPTION

Figure 1:
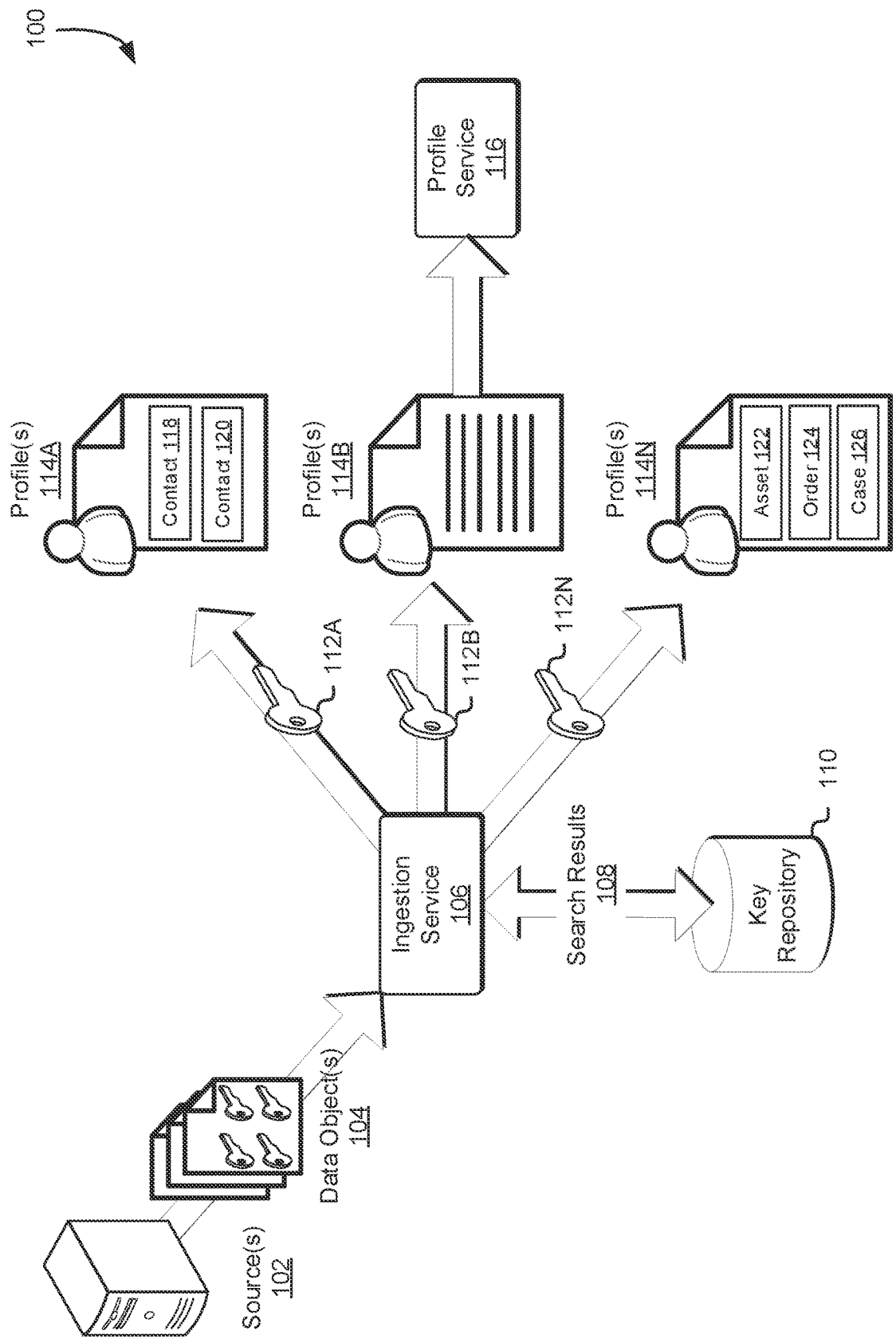
FIG. 1 illustrates an environment in which heterogeneous data is ingested and stored in association with profiles in hierarchical way, in accordance with an embodiment.

Systems and methods are described herein relating to heterogeneous data object ingestion that enables loosely related data to be coherently organized into profiles and hierarchies within profiles. In some aspects, data objects including various data in various formats may be ingested from various sources (e.g., various customer relationship management (CRM) systems). The data objects may include data related to profile information of an entity (e.g., a customer), such as contact information relating to one or potentially many individuals linked to or associated with an account of the entity. In other cases, the data objects may include data relating to various information associated with an account history, such as including information pertaining to assets relating to the account, cases associated with the account, or order history information. In some aspects, the data objects may originate from one or many sources, including various customer relationship management systems, which may indicate what type of information the data objects contain. In various examples, the source and the indicated type of other information contained within the data object may be used to convert or map the data object into one of a number of standard templates, which format the data contained in the data objects in a way that is made usable by various other applications. The converted data object (e.g., standardized data object) may then be associated with a profile, such as adding the standardized data object to an existing profile, or by adding it to a newly created profile. In some cases, multiple instances of the same standardized data object, or multiple instances of different standardized data objects, or a combination thereof, may be associated with a single profile. The data objects may be organized in a hierarchy within the profile, such that various different relationships of data objects can be maintained and stored with one or more profiles.

In some examples, a single profile contains all the information collected and ingested for a particular entity (e.g., a user) and enables access to the information from a single profile view. An ingestion service may be responsible for ingesting (e.g., collecting, processing, storing, etc.) data objects from various sources and persisting and/or updating profiles to include information obtained from the data objects and/or the data objects themselves. A profile can include any number of fields representing data associated with a user or other entity, and any number of data objects of one or more data object types such as data objects that have been converted to a standardized format or data objects that have their own structure. In addition to maintain profiles, the data storage model may include keys that are indexed and associated with the profiles and data objects, such that when data objects are ingested the keys can be used to determine a particular profile or other data object to associate the data objects with. In some aspects, a data object, once ingested and associated with a profile, may itself be associated with one or more other data objects, to create a hierarchy of data objects, organized at a high level by profile. In some aspects, a profile may contain multiple data objects having a contact data type, where each contact data object may contain information pertaining to an individual or entity, with each individual or entity linked to or associated with the profile. In this example, each contact data object may in essence be or refer to a child profile or the main or parent profile. In some cases, keys may be generated for the data objects, such that the data objects may be individually searchable, and/or may be provided in response to queries for related data objects and/or profiles.

In some aspects, when ingesting a data object, an object mapping can be used to obtain a set of keys associated with profiles and data objects. In such examples, an index or other data store is searched using at least one key of the set of keys to determine a profile associated with the data object, and/or to locate individual data objects after they have been ingested. In this manner the set of keys can be used to relate heterogeneous data objects (e.g., records, order history, communications, account information, etc.) to a particular profile. In addition, this enables access to these different data objects from a single location. For example, a profile can represent a particular entity and can provide access to various ingested data objects including information, for example, associated with deliveries, support contacts, emails, and other information associated with the particular entity.

As described in greater detail below, the keys can include any value that is indexed. In one example, the keys can include string values, phone numbers, email addresses, street addresses, account numbers, or other values that are capable of being indexed. Furthermore, the keys can include both unique and non-unique keys (e.g., unique relative to other keys used by the profile service). In addition, the keys can be associated with a particular type. In one example, a key is assigned as a search only key (e.g., phone number), which may prevent the profile service from persisting the key. Other types of keys can include profile identifying keys (e.g., an account number), which can be used to uniquely identify a data object within a profile. Furthermore, in some examples, unique keys (e.g., profile identifying keys) are used to replace data objects associated with a particular profile with new data objects including updated information.

As described in greater detail below, the keys obtained from the data objects include various values such as string values which, in some examples, are normalized or standardized. For example, normalizing phone numbers, names, addresses, account numbers, and other values associated with the keys. Once the keys have been obtained from a particular data object and the data object has been ingested by the ingestion service, the keys are then searchable by the ingestion service, profile service, or other systems and services of a computing resource service provider. This enables systems and services of the computing resource service provider to determine which profile that a particular piece of information is related to (e.g., a particular data object). The data objects can include any structured and/or semi-structured data object. Furthermore, the data objects can include an object type and/or a domain name (e.g., a logical container that allows for multiple groups of profiles).

When ingesting data objects, the ingestion service or other system, utilizes the object mapping to determine the location of a key within the data object, extract the key, and searches the key in a key repository or other index. If the key is stored in the key repository, this indicates that a previously ingested data object including the key has been persisted and associated with a particular profile or data object. As a result, the ingestion service or other system, may determine that the data object should be associated with a particular profile or other data object as well. However, if none of the keys obtained from the data object match keys stored in the key repository, a new profile may be created and associated with the data object. In some situations, the ingestion service or other system, may prevent the creation of new profiles using particular types of keys and an error is returned. Returning to the previous examples, if the key is found in the repository or a new profile is created, the profile service or other system, causes the data object to be persisted and updates the profile based at least in part on information included in the data object (e.g., fields such as name, address, order number, etc.). In addition, the profile service or other system, can also update and/or generate keys maintained by the key repository.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages, including some or all of the following: (1) allowing ingestion of heterogeneous data objects and creating a hierarchy to access those data objects; (2) simplifying the user experience when ingesting heterogeneous data objects from a plurality of different sources; (3) allowing loosely related data objects to be correlated and accessed through a single profile; (4) creating a single location of the aggregation of all data related to a particular entity, and other benefits and advantages, as will be described in greater detail below throughout this document.

FIG. 1 is a block diagram illustrating an environment 100 in which an ingestion service 106 obtains a set of keys 112A-112N from data objects 104 in order to associate the data objects 104 with a set of profiles 114A-114N in accordance with at least one embodiment. In various embodiments, the data objects 104 are obtained from one or more source(s) 102 by the ingestion service 106. The data objects 104, as described in greater detail below, may include structured or semi-structured data objects. In one example, a semi-structured data object includes one or more fields organized within the data object in accordance with a format and/or syntax associated with the semi-structured data objects. In various examples, the data objects include documents, contact lists, call logs, chat logs, data logs, HyperText Markup Language (HTML) data, Extensible Markup Language (XML) data, JavaScript data, Cascading Style Sheets (CSS) data, JavaScript Object Notation (JSON) data, and/or another appropriate structured language or semi-structured data.

In various aspects, the ingestion service 106 includes a computer system, program, process, client, server, service, application, module, operating system entity, controlling domain, communication node or collection of these and/or other such computer system entities that implement various components of the ingestion service 106 as described in the present disclosure. In one example, the ingestion service 106 includes an interface that receives Application Programming Interface (API) calls that, as a result of being processed, cause servers executing the ingestion service 106 to perform various operations described in the present disclosure such as ingesting data objects 104.

In various embodiments, the source(s) 102 include any computer system capable of recording, storing, and/or transmitting the data objects 104. For example, the source(s) 102 include, in various embodiments, a service, a database, storage system, client computer system, customer relationship management (CRM) system, service, or other computing device. In one example, the source 102 includes a cloud contact center which records communications between users and the cloud contact center as data objects 104. In such examples, the data objects 104 can include user phone numbers, account numbers, an identifier of the communication, subject information, call logs, chat logs, or other information associated with the communication stored as a JSON data object. Examples of JSON data objects are described in greater detail below. In various embodiment, this enables data from any of the source(s) 102 to be ingested and incorporated into the profiles regardless of how the profile has the data organized or how the incoming data objects have the data organized.

In various embodiments, the sources 102 transmit the data objects 104 to the ingestion service 106 periodically or aperiodically. For example, the sources 102 may transmit the data objects 104 contemporaneously or near contemporaneously with generation of the data objects 104. Returning to the example above, once a communication between a user and the cloud contact center is complete, a corresponding data object is generated and/or completed and transmitted to the ingestion service 106. In yet other embodiments, an intermediary such as a storage service obtains the data objects 104 and the ingestion service 106 obtains a notification that the data objects 104 have been received by the storage service. In such embodiments, the ingestion service 106 may place the data objects 104 in a queue and process the data objects 104 for ingestion from the queue.

In various embodiments, an API call causes the ingestion service 106 to obtain the data objects 104 from a data store of a data storage service accessible to the ingestion service 106. In yet other embodiments, the sources 102 provide the data objects 104 directly to the ingestion service 106 (e.g., via an API call). In addition, a topic or feed can be used to trigger the API when the data objects are available for ingestion in accordance with at least one embodiment. Once the data objects 104 are obtained by the ingestion service 106, in various embodiments, the ingestion service 106 unpacks the data objects 104 to obtain a set of keys 112A-112N. As described in greater detail below, the set of keys 112A-112N, in one example, includes different types of keys that define how the ingestion service 106 utilizes the keys. For example, the set of keys 112A-112N includes profile keys that the ingestion service 106 uses to search a key repository 110.

In various embodiments, at least one key of the set of keys 112A-112N identifies a particular profile of the set of profiles 114A-114N maintained by a profile service 116. As described in greater detail below, a profile of the set of profiles 114A-114N is associated with a particular entity, and enables access to all ingested information associated with the particular entity. In an embodiment, once the ingestion service 106 obtains the set of keys 112A-112N from the data objects 104, a subset of keys of the set of keys 112A-112N are used to obtain search results 108 from the key repository 110. As described in greater detail below, the key repository 110, in at least one embodiment, includes an index of at least a subset of the keys ingested by the ingestion service 106 and is included in at least one profile of the set of profiles 114A-114N. In one example, the keys are not cryptographic keys, but rather represent information such as, for example, names, email addresses, phone numbers, etc. of entities stored as profiles, as such the key repository 110 indexes particular values (e.g., a phone number) with the profile within which the particular value is stored and/or associated with. Additional details relating to ingesting and generate keys for profiles may be found in U.S. patent application Ser. No. 17/364,389, titled "HETERGENOUS DATA INGESTION AND INTEGRATION," filed on Jun. 30, 2021, the contents of which are herein incorporated by reference in their entirety.

In some aspects, profiles 114A-114N may include additional data objects, such that represent contacts or individuals or entities 118, 120, and/or data objects that represent various types of data, such as assets 122, orders 124, cases 126, or various other forms or organizations of various data, as will be describe din greater detail below. In some aspects, one or more contacts can be associated with a profile, such as contacts 118, 120 with profile 114A. In some cases, contacts 118, 120 may represent members of an account associated with a profile 114A. A contact, such as contact 118, 120 may include various information relating to an individual or entity, such as contact information, including email dress, address, phone number, account information. A data object that is ingested and becomes a contact may be referred to as a contact data object or a data object.

Similarly, a profile, such as profile 114N, may have or be associated with various other types of data objects. For example, an asset data object, such as data object 122, may include information relating to one or more assets associated with a profile or contact, such as physical assets, digital assets, and various other forms of items that a CRM system may account for, such as financial instruments and the like. An order data object, such as data object 124, may include various information relating to prior orders associated with a profile or contact, such as items ordered, cost, payment, shipping, and various other details relating to a given order. A case data object, such as data object 126 may include various information relating to a case associated with a profile or contact, such as investigatory case, a return of an item, etc. The described techniques may generate keys for some or all of these various types of data objects that may be stored and associate with profiles, in a similar way that keys may be generated for profiles. This may enable precise access to these various data objects in relation to profiles and may enable creation of simple or complex hierarchies of data objects that may be made accessible to various entities.

In various embodiments, the search results 108 indicate a subset of keys of the set of keys 112A-112N that match (e.g., are equivalent to or otherwise associated with) keys maintained in the key repository 110 and that are associated with one or more profiles of the set of profiles 114A-114N. In one example, the set of keys 112A-112N includes a first key corresponding to a name (e.g., "John Doe") and a second key corresponding to a phone number (e.g., (555) 123-4567), the search results 108 indicate a match to one or more profiles if the index includes either the first key, the second key, or any equivalents (e.g., the first key with the value "John Doe" is the same as an indexed value "John Doe" maintained in the key repository 110). In various embodiments, equivalents include keys that represent the same data, but that may be in a different format. For example, a phone number may be considered equivalent if the data is the same, but the format is different (e.g., "555-123-4567" and "(555) 123-4567"). In yet other embodiments described below, the values corresponding to keys are normalized when determined whether a particular key extracted from a data object matches a particular key indexed in the key repository 110.

In an embodiment, if the search results 108 obtained by the ingestion service 106 indicate more than one result (e.g., profiles), the result is discarded as invalid. In other words, in such embodiments, if a particular key is associated with more than one profile, the ingestion service determines the search results are invalid and does not use the particular key to associate the data object from which the particular key was obtained with a profile of the set of profiles 114A-114B. Furthermore, if the search for a particular key returns an invalid result (e.g., no matching profiles, more than one matching profile, etc.), the ingestion service 106 selects another key to perform the search. In various embodiments, searching for the subset of keys within the key repository 110 is performed in serial (e.g., a first key is selected and searched, if the results are invalid, then a second key is selected and searched). In yet other embodiments, the subset of keys is searched in parallel in order to obtain results faster and/or determine a plurality of matches. The ingestion service 106, in various embodiments, performs the search and obtains the search results until a profile is uniquely (e.g., relative to the set of profiles 114A-114N) identified. In addition, in some embodiments, a plurality of keys obtained from a particular data object 104 are capable of uniquely identifying a particular profile (e.g., profile 112A). In such embodiments, the ingestion service 106 can terminate the search once the first key is determined to uniquely identify the particular profile. In one example, a first key representing a name and a second key representing an email address both uniquely identify the profile 112A, when ingesting the data object 104 with these keys, the ingestion service 106 terminates the search once either the first key or the second key has been searched and identifies the profile 112A as being associated with the data object 104.

In addition, in various embodiments, the ingestion service 106 maintains a hierarchy for searching particular keys of the set of keys 112A-112N. In one example, certain keys are marked as secondary. In such an example, keys marked as secondary may be searched only if all other keys obtained for a particular data object have failed to return a valid result (e.g., a particular profile). In various embodiments, the search results 108 indicate that a particular profile includes that same value as a search for the same field. In one example, the keys include a key name and/or category (e.g., username) and a value (e.g., "John Doe"). In such examples, the search results 108 indicate a positive result (e.g., a match) if the value and the category match. In addition, values associated with the keys, in an embodiment, can be normalized prior to searching and storing. For example, a string value representing the key can be normalized (e.g., removing white spaces, changing case, removing special characters, etc.) and a search for the normalized string value can be performed on the category matching the key as indicated in the key repository 110 (e.g., name, email, address, phone number, etc.).

In various embodiments, the key repository 110 includes any database or other storage system that supports indexing. For example, the key repository can include any database such as a Structured Query Language (SQL) database or a non-SQL database. The key repository 110, in at least one embodiment, provides a repository for keys that can be searched from specific values and/or string values. In addition, the set of profiles 114A-114N includes semi-structured information about a particular entity in accordance with at least one embodiment. Furthermore, in some examples, a standard profile scheme is used containing one or more fields, such as phone numbers, email addresses, names, and other data. In various embodiments, data obtained from the data objects 104 is retrieved and converted to the standard format regardless of the source 102.

In various embodiments, a profile object is a single unit of information known about a profile (e.g., data object associated of a profile). Furthermore, in various embodiments, a particular profile includes a set of profile objects that includes data associated with an entity. Such data, in an example, can include information about a phone call, a ticket, a case, a click-stream record from a website, name, address, phone number, other contact information, order history, promotional material, support information, sales information, marketing information, biographical data, historical data, or any other data that can be associated with an entity. As described in the present disclosure, profile objects, in one example, can be obtained from a semi-structured JSON document. Furthermore, in various embodiments, the profile objects can be associated with type information and/or field information. In such embodiments, the type and/or field refers to a particular location and/or structure as indicated in an object mapping described in greater detail below in connection with FIG. 4. In one example, the object mapping defines how that specific type of data object (e.g., contact cards, call logs, etc.) should be ingested either into a profile or as a separate data object to be linked or associated with a profile. In addition, in various embodiments, the object mapping indicates to the ingestion service 106 how to ingest a specific type of data object. For example, the object mapping indicates how data should be populated from the data objects (e.g., of the particular type indicated) and ingested into the standardized or normalized data objects and/or profiles, what fields should be indexed in the data object, and how those fields should then be used to assign the data object a specific profile.

In various embodiments, the data object mapping indicates a conversion schema that maps particular data objects 104, types of data objects 104, data within the data objects 104, and/or fields within the data objects 104 to the set of profiles 114A-114N maintained by the system (e.g., profile service 116). Data objects 104, in various embodiments, include various semi-structured data objects such as JSON blobs, XML documents, of other structured data or unstructured data. An example is illustrated by the following pseudo-code of a data object:

```
{
    "account": 1234,
    "email": "john@examplecorp.com",
    "address": {
        "address1": "Street",
        "zip": "Zip",
        "city": "City"
    },
    "firstName": "John",
    "lastName": "Doe"
}
```

In an embodiment, data object mapping defines a schema for mapping or otherwise converting values within the data object 104 to values within profiles 114A-114N and/or standardized data objects such as any of data objects 118-126. In addition, the data object mapping, in various embodiments, defines indexing for keys (e.g., the set of keys 112A-112N) associated with the profiles 114A-114N and/or standardized data objects such as any of data objects 118-126. In one example, the following pseudo-code shows that incoming data object mapping into a particular profile and indexing PersonalEmailAddress, fullName, and accountId (which is a unique key relative to the set of keys):

```
{
    "Fields": {
        "accountId": {
            "Source": "_source.account",
            "Target": "_profile.AccountNumber",
            "ContentType": "NUMBER"
        },
        "shippingAddress.address1": {
            "Source": "_source.address.address1",
            "Target": "_profile.ShippingAddress.Address1"
        },
        "shippingAddress.postalCode":
            "Source": "_source.address.zip",
            "Target": "_profile.ShippingAddress.PostalCode"
        },
        "shippingAddress.city": {
            "Source": "_source.address.city",
            "Target": "_profile.ShippingAddress.City"
        },
        "personalEmailAddress": {
            "Source": "_source.email",
            "Target": "_profile.PersonalEmailAddress",
            "ContentType": "EMAIL_ADDRESS"
```

-continued

```
  },
  "fullName": {
     "Source": "{{_source.firstName}} {{_source.lastName}}"
  }
  "firstName": {
     "Source": "_source.firstName",
     "Target": "_profile.FirstName"
  },
  "lastName": {
     "Source": " source.lastName",
     "Target": "_profile.LastName"
  },
}
"Keys": {
  "_email": [
     {
       "FieldNames": ["personalEmailAddress"]
     }
  ],
  "_fullName": [
     {
       "FieldNames": ["fullName"]
     }
  ],
  "_account": [
     {
       "StandardIdentifiers": ["PROFILE", "UNIQUE"],
       "FieldNames": ["accountId"]
     }
  ]
  }
}
```

In this example, "email" and "fullname" are indexed, but are not used to search for the profiles 114A-114N. Furthermore, in this example, the "account" key is indicated as a unique key. In various embodiments, any time a particular data object with the same "account" value is ingested, the ingestion service 106 or other service, overwrites the previous value with the same "account" value.

Figure 2:
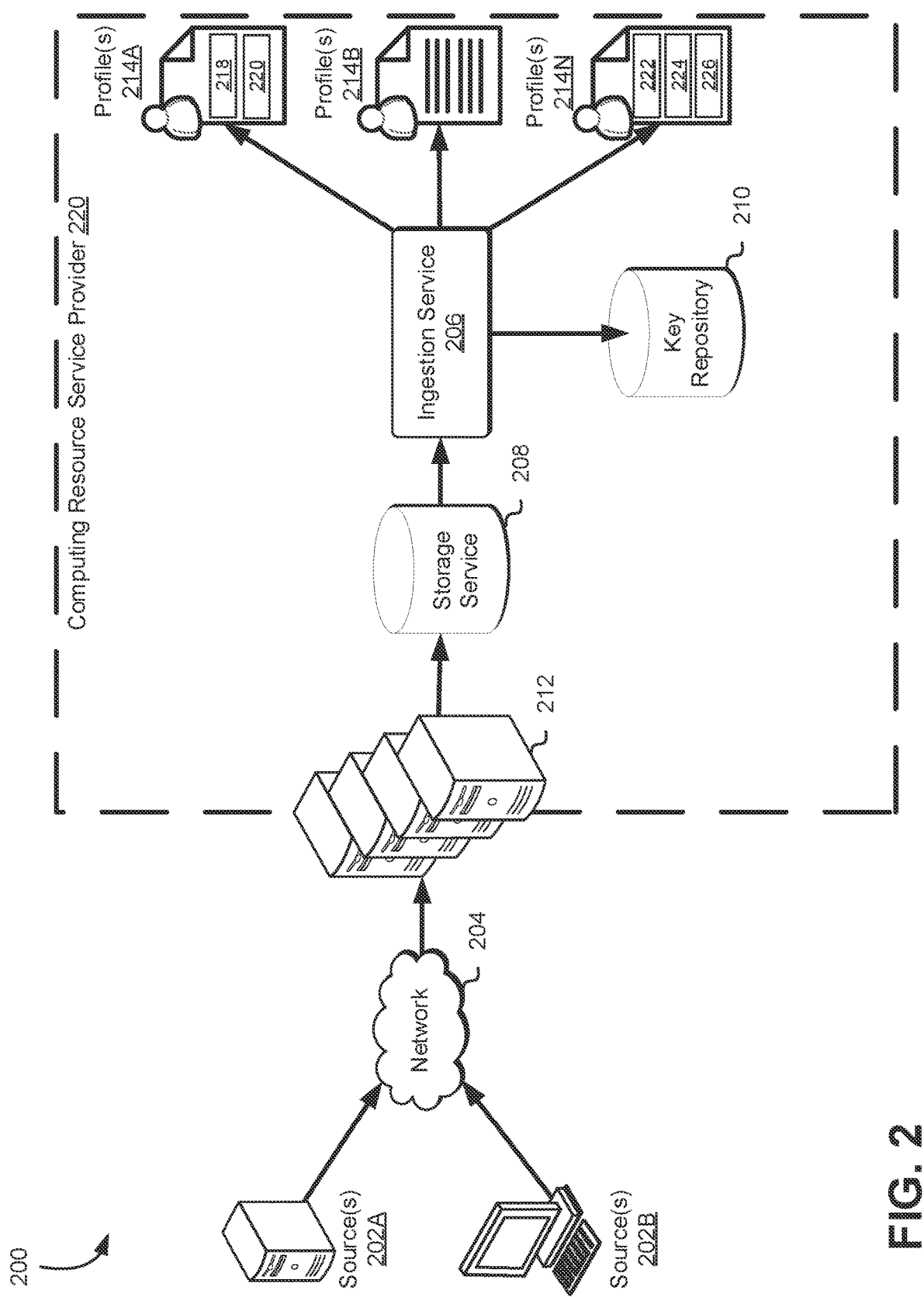
FIG. 2 illustrates an environment in which an ingestion service stores data objects in association with a set of profiles of a profile service in accordance with an embodiment.

FIG. 2 is a block diagram illustrating an environment 200 in which an ingestion service 206 ingests data objects from various sources 202A & 202B to populate a set of profiles 214A-214N in accordance with at least one embodiment. In various embodiments, a computing resource service provider 220 provides entities with computing resources to perform various operations as described in the present disclosure. For example, the computing resource service provider 220 provides computational and storage resources to allow an entity to maintain the set of profiles 214A-214N and ingest data objects (not shown in FIG. 2 for simplicity) which can be used to update the set of profiles 214A-214N and related data objects 218-226. In some cases, data objects 218-226 may include one or more aspects of data objects 118-126 described above in reference to FIG. 6. Furthermore, the set of profiles 214A-214N, in at least one embodiment, includes a logical container for information associated with a single entity or user as described above in connection with the set of profiles 114A-114N illustrated in FIG. 1.

The computing resource service provider 220 may provide a variety of services to the entity and the entity may communicate with the computing resource service provider 220 via an interface, which may be a web service interface or any other type of user interface. As illustrated in FIG. 2, server computer systems 212, in accordance with an embodiment, provide the interface for the services of the computing resource service provider 220 as well as execute the services themselves. In one example, each service has a separate interface. In other examples, subsets of the services have corresponding interfaces in addition to or as an alternative to the interface described above. In an embodiment, the entity is an organization that utilizes one or more of the services provided by the computing resource service provider 220 to maintain and deliver information to its employees, which may be located in various geographical locations. For example, a profile service as described above in connection with FIG. 1, provides support agents with information associated with the profiles 214A-214N to help users troubleshoot and correct various issues.

In another example, the entity utilizes the services of the computing resource service provider 220 to provide content from the sources 202A and/or 202B for ingestion by the ingestion service 206. As shown in FIG. 2, the sources 202A and/or 202B communicate with the computing resource service provider 220 through a network 204, whereby the network 204 may be a communication network, such as the Internet, an intranet or an Internet service provider (ISP) network in accordance with an embodiment. In one example, communications from the sources 202A and/or 202B to the computing resource service provider 220 cause the computing resource service provider 220 and/or services thereof, such as the ingestion service, to operate in accordance with one or more embodiments described in the present disclosure or a variation thereof. For example, data objects from the sources 202A and/or 202B are obtained by the server computer systems 212 of the computing resource service provider 220 and stored by a storage service 208 such that the data objects are accessible by the ingestion service 206.

The computing resource service provider 220 may provide various computing resource services to the entity. The services provided by the computing resource service provider 220, in this example, include a storage service 208. It is noted that not all embodiments described herein include all the services described with reference to FIG. 2 and additional services may be provided in addition to or as an alternative to services explicitly described. As described herein, each of the services may include one or more web service interfaces that enable the entity and/or other services to submit appropriately configured API calls to the various services through web service requests. In addition, in various embodiments, each of the services include one or more service interfaces that enable the services to access each other (e.g., to enable the ingestion service 206 to store data in or retrieve data from the storage service 208 and/or to access one or more databases provided by a database service).

In various embodiments, the storage service 208 comprises one or more computing resources that collectively operate to store data for the entity and/or other services using various storage devices (and/or virtualizations thereof). For example, the storage service 208 operates using computing resources (e.g., databases) that enable the storage service 208 to locate and retrieve data quickly and provided data in response to requests for the data. In an embodiment, the storage service 208 maintains stored data in a manner such that, when a request for a data object is retrieved, the data object can be provided (or streaming of the data object can be initiated) in response to the request. As noted, data stored in the storage service 208, in an example, is organized into data objects.

The data objects, in various embodiments, have arbitrary sizes except, perhaps, for certain constraints on size. Thus, the storage service 208 stores numerous data objects of varying sizes from the sources 202A and/or 202B in accordance with an embodiment. In various embodiments, the storage service 208 operates as a key value store that associates data objects with identifiers of the data objects which are used by the entity and/or other services to retrieve or perform other operations in connection with the data objects stored by the storage service 208. For example, the ingestion service 206 obtains a set of identifiers associated with data objects provided by the sources 202A and/or 202B and stored by the storage service 208. In such examples, the identifiers are placed in a queue and, when the ingestion service 206 ingests the data objects, the identifiers are retrieved from the queue and used to obtain the data objects (e.g., an API call to the storage service) from the storage service for ingestion.

In various embodiments, a notification service (not illustrated in FIG. 2 for simplicity) comprises a collection of computing resources collectively configured to provide notifications and/or topics to which entities and/or other services can subscribe to receive notification. For example, the ingestion service 206, via the notification service, receives a notification when the sources 202A and/or 202B provide data objects for ingestion (e.g., once the data objects have been received by the server computer systems 212 and/or stored by the storage service 208). In an embodiment, the notification service is used to generate topics for which entities and/or other services seek to receive notifications, execute applications, subscribe to topics, publish messages, or obtain delivery of the messages over a protocol of choice (e.g., hypertext transfer protocol (HTTP), e-mail, short message service (SMS), etc.). The notification service, for example, provides a "push" notification mechanism without the need to periodically or aperiodically check or "poll" for new information and updates. The notification service, in other embodiments, is used for monitoring applications by the ingestion service, workflow systems, time-sensitive information updates, mobile applications, and other services.

As described above, in various embodiments, the ingestion service 206 obtains a set of keys (not shown in FIG. 2 for simplicity) from the data objects in order to associate the data object with a single profile of the set of profiles 214A-214N. In addition, the set of keys are indexed and stored in a key repository 210. The key repository, in an embodiment is provided by a database service. The database service, in one example, is a collection of computing resources that collectively operate to run one or more databases. The ingestion service 206, in such examples, operates and manages a database (e.g., the key repository 210) from the database service by utilizing appropriately configured API calls. This, in turn, allows the ingestion service 206 to maintain and potentially scale the operations in the key repository 210 in accordance with an embodiment. Other services of the computing resource service provider 220, in various embodiments, include, but are not limited to, object-level archival data storage services, services that manage and/or monitor other services.

In various embodiments, unless otherwise stated or clear from context, the term "service" is understood to be a computer system program, process, client, server, service, application, module, operating system entity, controlling domain, communication node or collection of these and/or other such computer system entities. Furthermore, in an example, a "service" is a client and/or a server configured to send and/or receive communications, data, requests, and/or other such requests from other services within an environment.

Figure 3:
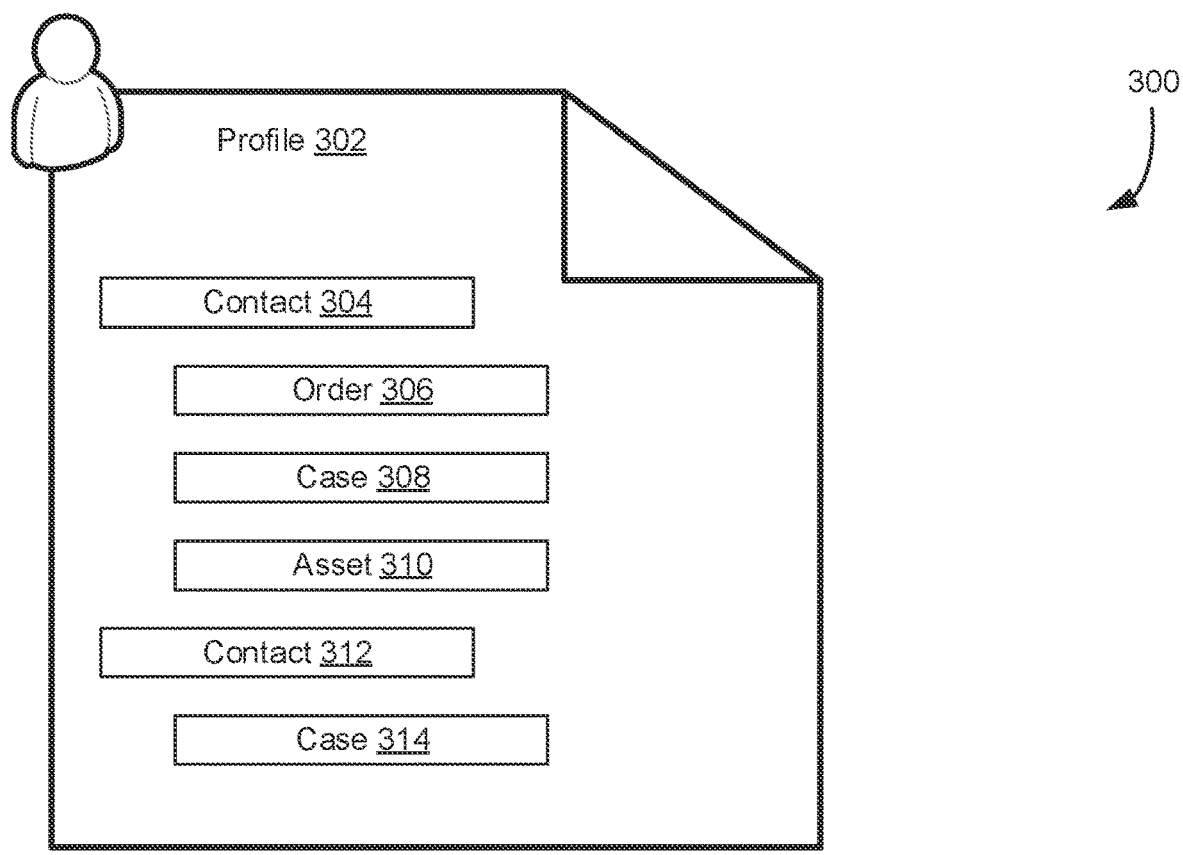
FIG. 3 illustrates two examples of profiles storing data objects in a hierarchical way, in accordance with an embodiment.
Figure 3:
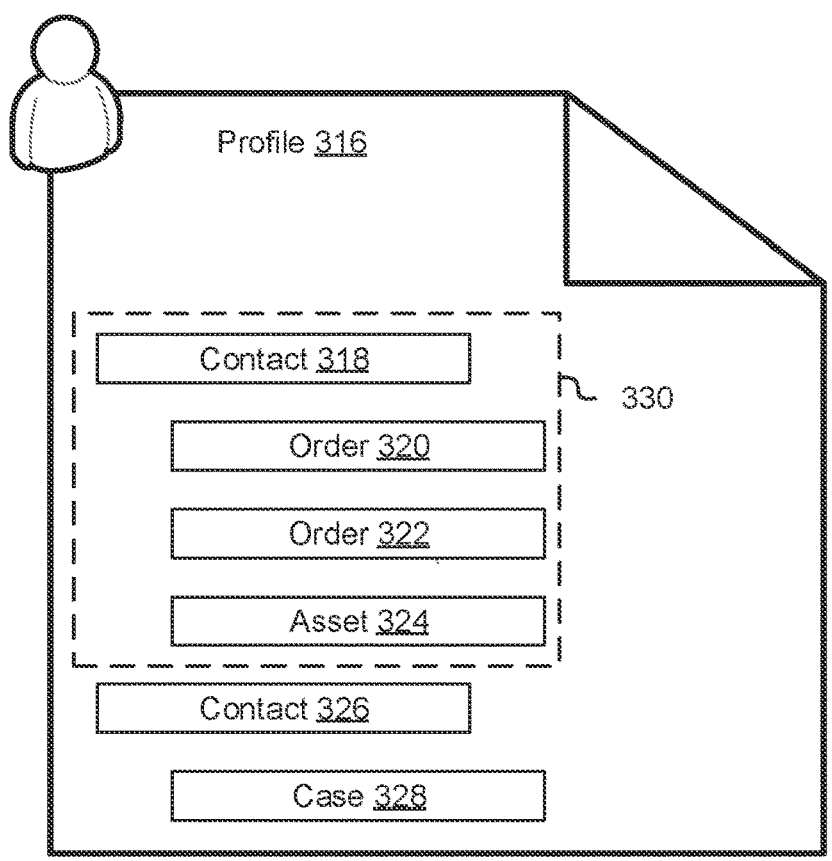

FIG. 3 illustrates two examples of profiles 302, 316 storing data objects in a hierarchical way. In the example illustrated, profile 302 may include two distinct contacts 304, 312, each associated with one or more different data object types, such as one or more of an order data object 306, a case data object 308, 314, and an asset data object 314. As used herein, a profile may be a collection of data objects, and may be ingested in a similar way as other data objects to form various relationships between the different data objects.

In the example illustrated, all of the data objects 304-314 of profile 302 may be accessed when the profile 302 is accessed, such that no restrictions are placed on accessing any of data objects 304-314. In another example of a profile 316, various data objects 318-328 may be organized in a similar way. However, in this example, one or more restrictions, such as access or modify restrictions, may be placed on some of the data objects, such that some of the data objects may not be access from or through other data objects, when appropriate permissions are not in place. For example, data objects 318-324 may be placed in a restricted group 330. In some cases, when another data object is accessed, such as contact 326, group 330 may not be made accessible or returned in response to a query to access the contact data object 326. However, in cases where profile 16 is accessed, group 330 of data objects may be accessed or returned. These various restrictions may be implemented by an identity access management system or service, as known in the art.

In order to associate these various data objects 304-314 in a hierarchical structure, one or more data fields may be added to the data objects as they are ingested to form standardized data objects. In one example, two data fields may be added, one indicating whether the given data object is or refers to a primary profile, and a second indicating the profile of a parent profile, in the case that the data object is not a parent or primary profile.

In some aspects a field, such as a Boolean field, or other indication, may indicate whether a given data object or collection of data objects (referred to herein both as a data object for simplicity) is a parent or primary profile, such that it should form its own separate record or item in when ingested. If a data object is a parent or primary profile, this field, which may be referred to as an isParentProfile field, may be set to true. If the data object is not a parent profile, it may be set to a default value or null. Another field (e.g., a parentProfileId field that can include any string value) may be included that indicates the name or identifier of the parent profile. In some cases, this field may be null when the data object is a parent profile and may include a parent profile ID when the data object is a child profile/contact data object to be associated with a primary profile. In some cases, the isParentProfile field may be set to true for a hierarchical profile and may be set to false for a standalone profile, or one that is not associated with any other contact data objects/profiles.

In some examples, when a data object is ingested and indicates a contact data object and refers to a parent profile ID (e.g., these indicators collectively translating to this contact being a child profile of an existing profile), then the fields of the parent profile may be modified to reflect that the profile is a parent profile. In addition, a key indicating or identifying the child profile/contact data object may be appended to the parent profile. The child data object, when it is converted into a standardized format, may also be modified to indicate that it is not a parent profile, but include the parent profile ID of the indicated parent profile. In this way, both data objects may be linked, such that when accessed, one may refer to the other and both may be presented to a user, for example, in response to a query of either.

In some cases, various other types of data objects, such as any of data objects 306-310, 314, and 320-324, 328 may be associated with a profile (e.g., parent profile 302, 316), and a child profile or contact data object 304, 312, 318, 326. In some cases, the key or identifier of the child profile/contact data object 304, 312, 318, 326 may be associated with the various data objects 306-308, 314 and 320-324, 328 to form various different relationships and hierarchies. In the case that a child profile identifier or key is not associated with a data object, the data object may simply be associated with a profile.

In some aspects, various restriction may be placed on how different data objects may be associated with one another, to facilitate better management of the data objects. In some examples, the relationship between one or more contact data objects or child profiles and parent profiles may be restricted. For example, in some cases, a parent profile may be able to be associated with multiple child profiles/contact data objects. In some aspects, a child profile may have or be associated with only one parent profile. Similarly, a child profile may not be a parent profile of another child, and a parent profile may not have a parent of its own. It should be appreciated that these specific restrictions may be useful for certain situations; however, the described techniques are not so limited. In some aspects, some or no restrictions may be implemented for different data objects, to provide more flexibility in data organization.

Figure 4:
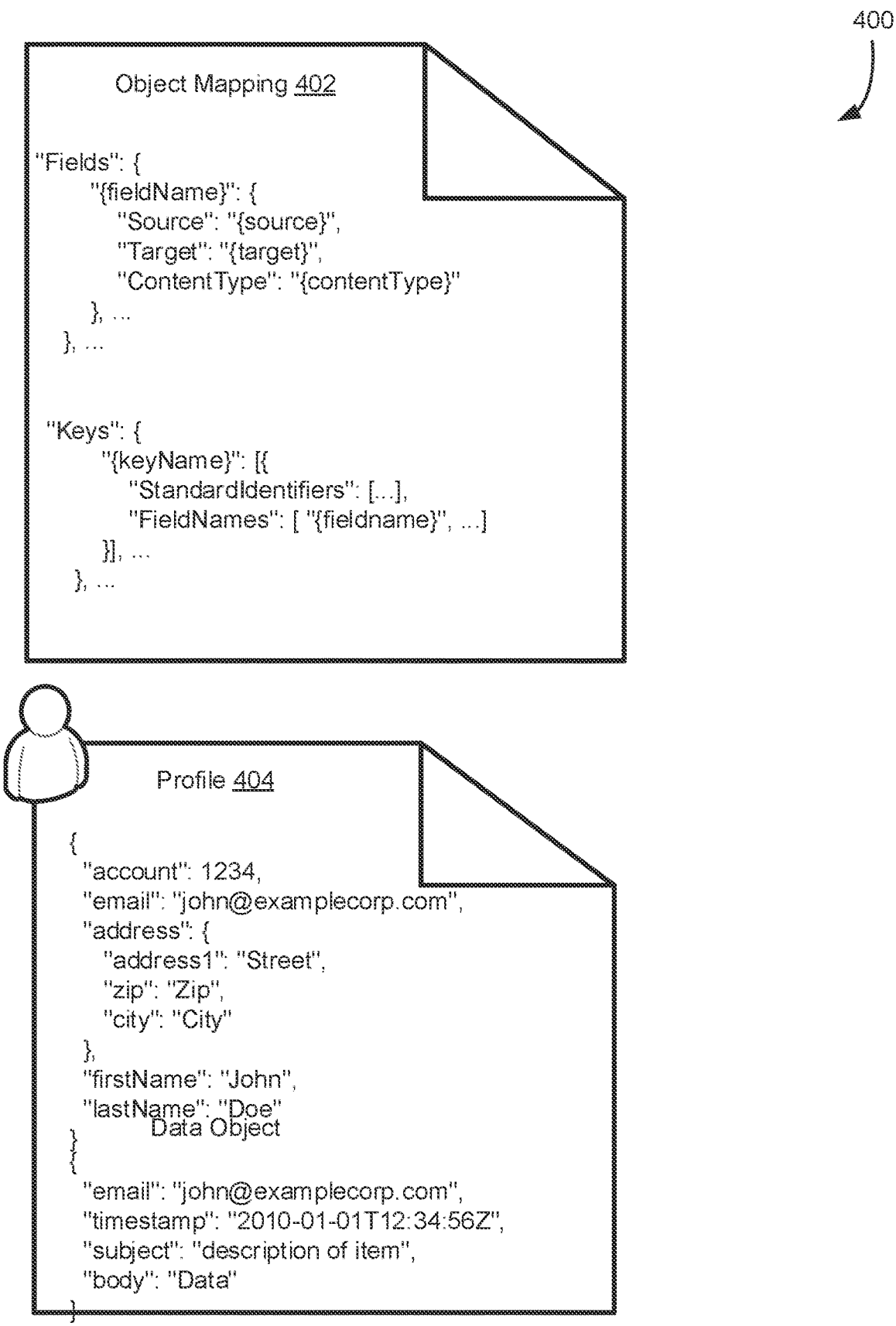
FIG. 4 illustrates an example of an object mapping that defines a conversion from a data object to a standardized format data object to be associated with a profile, in accordance with an embodiment.

FIG. 4 is a diagram 400 illustrating an object mapping 402 used to map data included in a data object to a data storage schema used to maintain data in a profile 404 or other data object. In various embodiments, the profile 404 includes a data storage model that represents how data is stored within the profile 404. For example, as illustrated in FIG. 4, the profile 404 includes a set of fields (e.g., "account," "email," etc.) that indicate a structure and/or location of data stored within the profile 404. In addition, the object mapping 402 provides a mapping and/or translation for data included in a particular type of data object to fields within the profile 404 in accordance with an embodiment. In one example, the object mapping 402 is associated with a customer list data object and provides a mapping of data within the customer list data object (e.g., account number, name, address, etc.) to corresponding fields in the profile 404.

In various embodiments, a profile parser or other source code executed by a computer system, converts data from an incoming data object (e.g., a data object being ingested by the ingestion service as described above) into the data storage model used by the profile 404. In addition, both the data object and any updates (if the data object includes data to update one or more fields in the profile 404) are persisted to the profile 404 in accordance with an embodiment. In one example, the data object is persisted within the profile along with any updates to one or more fields of the profile 404. In another example, an identifier or other data suitable for obtaining the data object (e.g., via an API call to a data storage service) is persisted in the profile 404 along with any updates to one or more fields of the profile 404. In addition, in various embodiments, the profile parser updates a set of indexes maintained in a key repository as described above, for the keys obtained from the data object and/or keys corresponding to fields that have been updated in the profile 404.

In an embodiment, the object mapping 402 defines or indicates where the keys are located within particular data objects and/or types of data objects. For example, the object mapping 402 provides a definition of one or more fields in an ingested data object that are to be mapped or otherwise assigned to a particular location and/or fields within the profile 404. In an embodiment, the object mapping 402 indicates to the ingestion service or other service fields in an ingested source data object to assign or otherwise store in corresponding fields in the profile 404. Various sources can define or otherwise provide the object mapping 402 including users, service providers, or other entities in accordance with an embodiment. For example, a cloud contact center can provide a mapping of contact records to profiles. In some cases, the object mapping may also include or be referred to as a template.

Furthermore, the object mapping 402, in an embodiment, includes information indicating fields in the data object that are to be indexed when ingested. For example, when data from a data object is ingested by the ingestion service, the indexed fields are determined based at least in part on information included in the object mapping 402. Indexing the keys, in various embodiments, allows the ingestion service to determine which profile a specific data object belongs to and/or is associated with (e.g., by searching the keys) and what values can be used to find the profile 404. For example, a user's name can be indexed, which allows agents (e.g., through the profile service or other service that can search the index) to find all profiles that belong to the user with that specific name.

As illustrated in FIG. 4, the key can be made up of one or more fields in accordance with an embodiment. The object mapping 402, in such embodiments, includes at least one key that uniquely identifies the profile 404 so that it can be updated by specifying the same value of this field (these requirements can be satisfied with a single key). For example, the profile 404 includes an "account" field for which each value is unique to a single profile. In various embodiments, a field definition specifies how to read a value for that field name from a data object (e.g., a data object of a particular type). In other embodiments, the field definition also specifies what kind of data is stored in the field. For example, as illustrated in FIG. 4 "Source:" specifies the data object (e.g., a JSON blob) being accessed; "Target:" specifies where in the profile 404 the data of this field should be mapped; "ContentType:" specifies the type of data being ingested.

In an embodiment, the following content types can be a specified string, number, phone number, email address, street address, name, and account number. In one example, if no "ContentType" is specified, a string value is used. Furthermore, "ContentType," in an embodiment, is used to determine how to index the value so it can be searched for. For example, if "ContentType" is set to phone number, a phone number is processed which it can search for in various formats (e.g., the string "+15551234567" matches "(555)-123-4567").

In various embodiments, the key contains one or more fields that together define the key that can be used to search for data, data objects, and/or the profiles associated with the key. In one example, the key repository is searched for using an API call and the key. As described above, the key can also be defined to uniquely identify the profile 404 or uniquely identify the data object itself in accordance with an embodiment. Furthermore, as described above, in at least one embodiment, key names are global to a domain and/or logical groupings of profiles. In other embodiments, if two keys share the same name in association with two different fields and/or data objects within the object mapping 402, the keys can be used to potentially link profiles together between different fields. For example, if the keys match between two distinct data objects, the ingestion service places the two data objects in the same profile (e.g., a phone number specified in one type of data object would be related to the same phone number specified in another type of data object).

In various embodiments, identifiers associated with keys allow the ingestion service or other service to set attributes on a particular key. For example, the identifier "profile" causes the key to be treated as a unique identifier for the profile (e.g., a search for a key marked a profile returns a single profile). Therefore, in such embodiments, if a key marked as "profile" is included in two or more profiles, the profiles will be merged. In yet other embodiments, keys can be indicated as "unique." In such embodiments, the "unique identifier" is specified by exactly one index for the field. This key is used to uniquely identify data of a particular field for either fetching profiles or updating a field based at least in part on a data object being ingested.

In yet other embodiments, the identifier "look up" indicates that the key is not stored after ingesting the data object. For example, the key is only to be used for determining the profile during ingestion and the key value is not associated with the profile during ingestion. In an embodiment, the identifier "new only" causes the ingestion service or other service to use the key to generate a new profile if a profile matching the key does not already exist before the data object is ingested, otherwise the key is only used for matching data objects to profiles. In another embodiment, the identifier "secondary" indicates that during the matching of a data object to a profile, the ingestion service first looks up all other keys prior to searching any keys marked "secondary." In addition, in various embodiments, an identifier can be assigned to a key that prevents the key from being used to generate new profiles.

As described in more detail above, two additional fields may be added to the profile data object 404 that is generated using the object mapping 402. These two data fields may include an isParentProfile field and a parentProfileId, or similar field that indicates similar information, to facilitate data objects hierarchies, such as profile hierarchies and/or data object hierarchies within various profiles.

In some aspects, an object mapping 402 may be similarly generated for various data objects of different types, such as any of a contact data object (e.g., a child profile), one of an asset, case, or order data object type, or for various other configurable data object types. In some cases, a mapping may correspond to a contact data object or child profile. In these cases, the mapping may incorporate one or more aspects of the profile mapping described above, but may additionally include an indication of whether the data object is a child profile and an indication of a related profile, such as an identifier of a parent profile. In some cases, these indications may include an isParentProfile field and a parent ProfileId. In some cases, a further indicator of a type of data object may also be included, such as whether the data object is a profile/contact data object or another type of data object (e.g., contact data object or not, or specifying one of a variety of different types, such as asset, case, or order). This type indicator may be used to determine if a data object can then be organized in a way where other data objects are organized in a hierarchy below or subordinate to that data object. In some cases, each of an asset, case, or order data object may have its own mapping, similar to the object mapping 402, or may share some or all aspects of a common data mapping, such as via use of a type indication in the mapping.

As used herein, a standardized data object may refer to the output or data structure that is produced after a data object is modified by object mapping 402. In some cases, the standardized data object may be a profile, such as profile 404, or may be a standardized data object, such as a standardized contact data object (e.g., child profile) which may be similar or the same as a profile, but may include a contact identifier. In other cases, the standardized data object may be of a different type than a standardized contact data object, such as one or an asset, case, or order standardized data object, or a standardized data object of a different type which may be custom defined. As also used herein, a standardized data object may refer to a data object that either has been modified or has been confirmed to already follow a certain format. The format may include relative locations of certain pieces of information (e.g., name, address, order number, item purchased, case number, asset identifier, etc.) for the different types of standardized data objects, certain types of values for certain data fields, inclusion of additional data fields, and so on.

Figure 5:
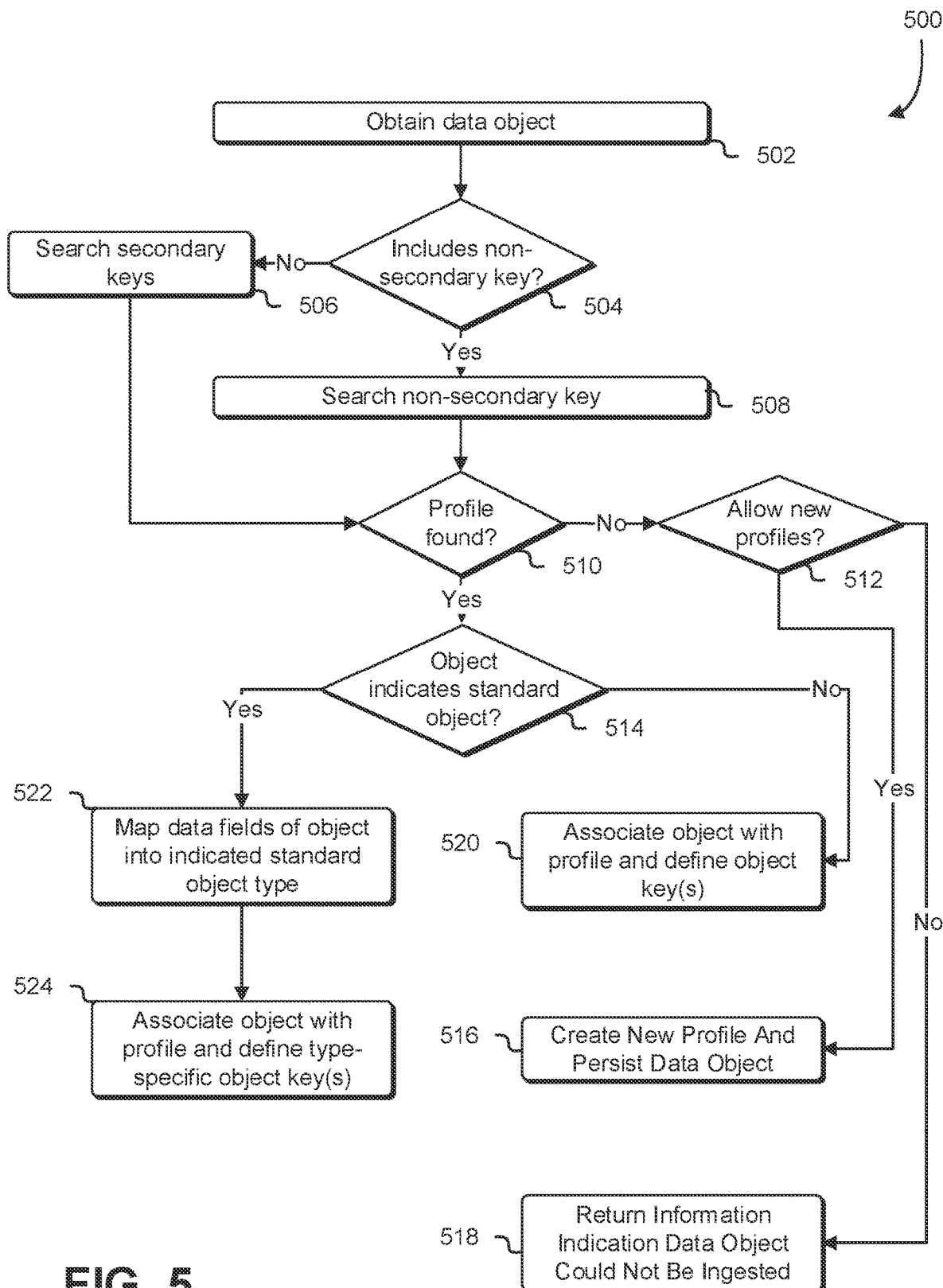
FIG. 5 illustrates an example process of ingesting heterogeneous data objects and associating the data objects with a profile, in accordance with an embodiment.

FIG. 5 shows a process 500 for ingesting a data object in accordance with at least one embodiment. The process 500, in an embodiment, is performed by an ingestion service or other service as described above. Now referring to FIGS. 5-7, the operations of processes 500 and 600, described in the present disclosure, in various embodiments, include a computing process that is performed using any combination of hardware, firmware, and/or software. The various functions, processes, and/or operations described in the present disclosure may be carried out by a processor executing instructions stored in memory. The processes, for example, are embodied as computer usable instructions stored on computer storage media. In addition, in some embodiments, the processes are provided by a standalone application, a service or hosted service (standalone or in combination with another hosted service), or a plug-in to another product, to name a few. In addition, the processes 500, 600, and 700 are described, by way of example, with respect to the computer system of FIG. 7. However, these processes may additionally or alternatively be executed by any one system, or any combination of systems, including, but not limited to, those described in the present disclosure. In addition, various operations of the processes 500, 600, and 700 may be performed in different and/or alternative orders, performed in serial or parallel, or omitted entirely.

Returning to FIG. 5, the system executing the process 500, at operation 502 obtains a data object. In various embodiments, the data object is obtained from a source as described above. In addition, in various embodiments, the data object is maintained by a storage service that is accessible to the system executing the process 500. At operation 504, the system executing the process 500 determines if the data object includes one or more non-secondary keys. As described above, keys indicated as secondary, in an embodiment, are used to search for a corresponding profile only if the data object does not contain any non-secondary keys. If the data object includes at least one non-secondary key, the system executing the process 500, in an embodiment, continues to operation 508 and searches the non-secondary keys. However, if no non-secondary keys are included in the data object, the system executing the process 500, in an embodiment, proceeds to operation 506 and searches the secondary keys.

Returning to operation 508, the system executing the process 500, in an embodiment, searches a key repository for the non-secondary keys. As described above, an object mapping indicates the location of keys included in particular types of data objects. For example, the system executing the process 500 obtains the object mapping associated with the data objects and extracts the string values associated with the keys (e.g., name, phone number, account number etc.). In various embodiments, the system executing the process 500, then searches the key repository of profiles matching the keys extracted from the data object. Similarly, in operation 506, the system executing the process 500, in an embodiment, searches the repository for profiles matching the secondary keys extracted from the data object if no non-secondary keys were extracted.

At operation 510, the system executing the process 500, in various embodiments, determines if a profile is found matching at least one key. In various embodiments, the system executing the process 500 searches the keys in serial and terminates the search once a single profile is returned matching a particular key being searched. In some cases, performance of operations 504 and 506 may be optional, such that process 500 may be performed without searching for any secondary keys to identify a profile.

In either case, if a single profile is determined (e.g., returned in the search results associated with a particular key), the system executing the process 500, continues to operation 514. In operation 514, the system may determine if the data object includes an indication of the type of data object/information that the data object includes. In some cases, operation 514 may include searching or a type indictor in the data object, as described above in reference to FIGS. 3 and 4. If no type information is identified, at operation 514, the system may then proceed to operation 520, in which the data object may be ingested in its native format and associated with the identified profile. In some aspects, operation 520 may additionally or alternatively include associating one or more keys or identifiers with the data object, a described in more detail above, such that the data object may be individually searchable within the database storing the profiles.

If, at operation 514, the system determines that the data object is associated with or otherwise indicates a data object type, process 500 may proceed to operation 522, in which the system may convert the data object into a standardized data object format based on the type of data object indicated in the data object. In some cases, the mapping may be performed using a data object mapping, such as object mapping 402 described above in reference to FIG. 4. In yet some cases, the object mapping may be referred to as a template, and may be selected from a plurality of templates, based on the type of data object and/or a source of the data object. In these cases, the source of the data object may be determined from the data object itself, such as included by the source itself, or it may be appended to the data object during the ingestion process by the system upon identifying the source from which the data object was received.

Next, at operation 524, the system may associate the standardized data object with the profile determined in prior operations. Operation 524 may also include defining one or more keys for the standardized data object, such that the standardized data object may be individually searchable separate from the profile. In some cases, the key or keys may be defined as one or more data fields of the data object. In yet some instances, the key or keys of the standardized data object may be associated with the profile, such that a search for the profile may return the standardized data object as well. In some cases, the data field used to define the key or keys identifying the data object may also include information indicating the type of the data object, such that the key itself identifies the type of data object.

In some cases, if no profile is returned from the search results, at operation 512, process 500 may proceed to operation 512, in which that het system executing the process 500, determines if at least one key allows for a new profile to be created. At operation 512, if the system determines a key allows a new profile to be created, the process 500 continues to operation 516. At operation 516, the system creates a new profile including the data extracted from the data object and persists the data object. For example, a new profile is created, and information extracted from the data object is associated with a user (e.g., name, phone number, account number etc.) and are persisted in the profile. Returning to operation 512, if the system executing the process 500 determines that none of the keys allow for the creation of a new profile, in an embodiment, the process 500 continues to operation 518. At operation 518, the system executing the process 500, in an embodiment, returns information indicating that the data object could not be ingested. For example, a notification is transmitted to a user associated with an account of a profile service indicating the data object could not be ingested.

In some cases, a data object may be ingested that references a profile and another data object, such as a contact data object or child profile. In these scenarios, the data object may be ingested and associated with a profile, such as via process 500 described above. In addition, in some cases, the data object may also reference another data object, such as a contact data object, to associate the data object with. In this case, during the ingestion process, the data object may also be modified to include an identifier or key of the contact data object to which it is to be associated with. When the contact data object or profile are subsequently queried, the data object may then be provided with either or both of the contact data object and profile. In instances where a data object references a contact data object/child profile that cannot be found, the data object may be associated with the profile only.

Figure 6:
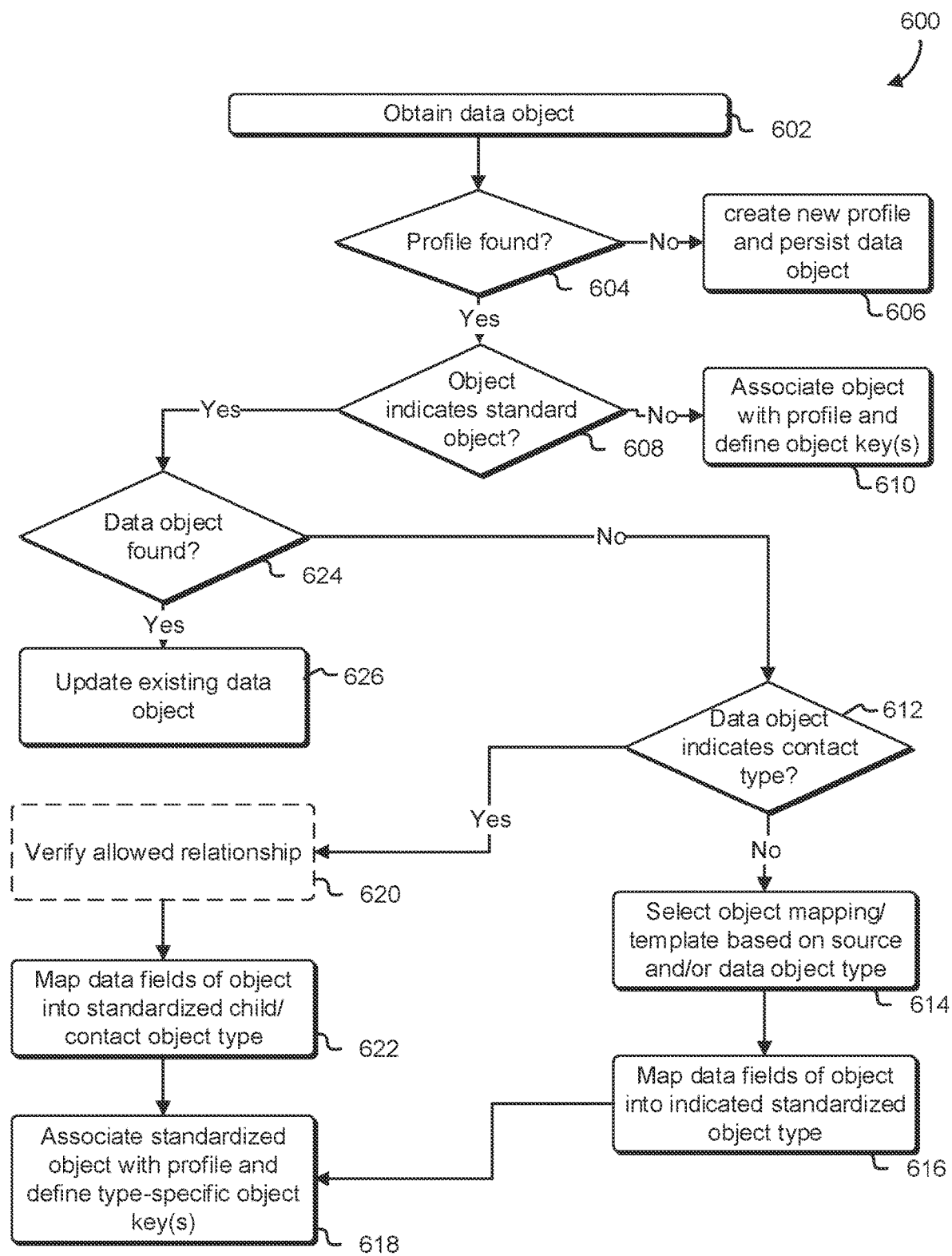
FIG. 6 illustrates another example process of ingesting heterogeneous data objects and associating the data objects with a profile, in accordance with an embodiment.

FIG. 6 shows another process 600 for ingesting a data object into a profile and data object hierarchy. Process 600, in an embodiment, is performed by a profile service or other service as described above. Process 600 may incorporate one or more operations of process 500 described above, and for the sake of brevity, those operators will not be described in great detail again here.

Process 600 may begin at operation 602, in which the system executing process 600 may obtain a data object, such as from one of a variety of different sources. The system may then determine, at operation 604, if a profile, which is indicated in the data object, can be found in a database of profiles accessible by the system. If not, a new profile may be created and the data object persisted, at operation 606, as descried in greater detail above. If the referenced profile is found, at operation 604, process 600 may proceed to operation 608, in which it may be determined if the data object includes an indicator of a type of data object. If the data object does not include type information, process 600 may proceed to operation 610, in which the data object (in its unaltered or unconverted state), may be associated with the profile and keys for the data object defined. In some cases, operation 610 may additionally include appending the data object key or keys to the profile.

If the data object is determined to include an indicator of a type of the data object, at operation 608, process 600 may proceed to operation 624, in which it may be determined if the data object already exists in the database. In some cases, operation 624 may include searching an index for a key or set of keys associated with the data object, such as may be specified by an object mapping specific to the source of the data object, the type of the data object, or a combination of the two. If the data object is found to already exist, the existing record or instance of the data object may be updated, at operation 626, to include data that is contained in the data object that is different than the data object that already exists in the database/is indexed by the system.

However, If the data object is not found, at operation 624, process 600 may proceed to operation 612, in which it may be determined if the data object includes an indication of a contact data object type (e.g., child profile). If the data object is not of the contact data object type, process 600 may proceed to operation 614, in which an object mapping/template may be selected based on at least one of the data object itself (e.g., type information or other information of the data object) and/or the source of the data object, as described in greater detail above. Next, at operation 616, one or more of the data fields of the data object may be mapped into the selected template/object mapping to form a standardized data object. The standardized data object may then be associated and stored with the profile, and one or more keys that identify the standardized data object may be defined, as described in greater detail above.

Returning back to operation 612, if the data object is determined to indicate a contact data object type, process may proceed to operation 620. At operation 620, the system may determine if the proposed relationship is allowed by the system, such as by comparing the proposed relationship between the data object and the specified profile. In some cases, this may include determining the values stored the isParentProfile and parentProfileId fields, as described in greater detail above. If the sParentProfile is a default or null value, and the parentProfileId field identifies a profile that does not itself have a parent, then the relationship may be allowed. In other cases, such as when a parent profile that has a child profile tries to associate itself with another parent profile, or other circumstances as described above, the proposed relationship may be disallowed, and an error message returned. It should be appreciated that operation 620 is optional, such that process 600 may be performed without operation 620 and the associated verification process.

In either case, process 600 may then proceed to operation 622, in which the data fields of the contact data object may be mapped to a standardized contact data object, and subsequently associated with the profile, at operation 618. Operation 618 may also include defining one or more keys that identify the standardized data object and associating those one or more keys with the standardized contact data object and/or profile, as described in greater detail above.

Figure 7:
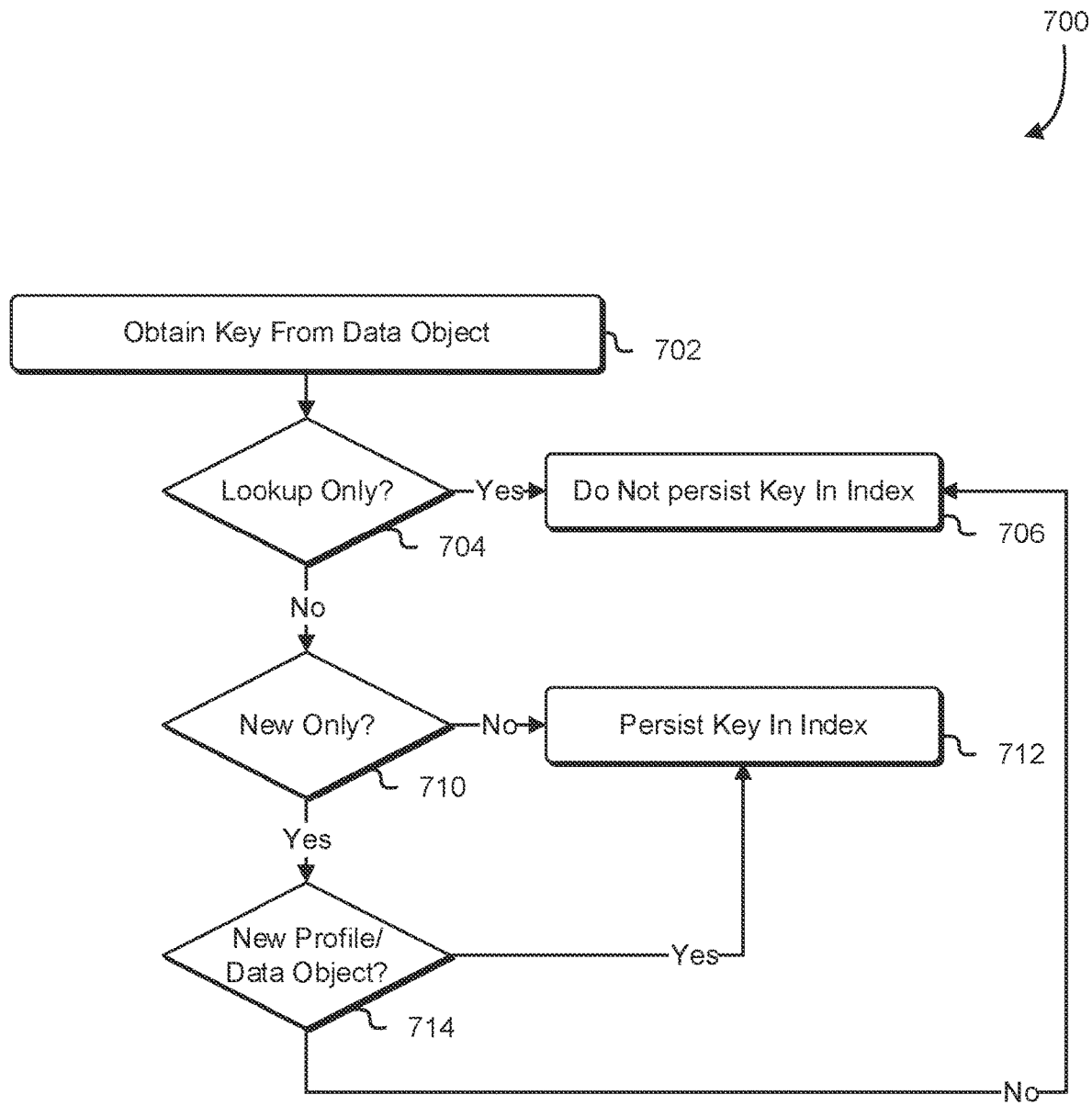
FIG. 7 illustrates a process of persisting keys in an index in accordance with an embodiment.

FIG. 7 shows a process 700 for updating a key repository in accordance with at least one embodiment. The process 700, in an embodiment, is performed by a profile service or other service as described above. At operation 702, the system executing the process 700, in an embodiment, obtains a key from a data object. As described above, the key, in an example, includes a string value extracted from the data object that is used to search for a matching value stored in a profile or other data object (e.g., a data object that has been converted into a standard or normalized of mat, which may be referred to herein as a standardized data object). At operation 704, the system executing the process 700, in an embodiment, determines if the key is assigned the identifier "lookup." As described above, identifiers can be assigned to a particular key to manage how the keys are ingested and indexed by the system executing the process 700. Returning to operation 704, if the key is identified as lookup only, the system executing the process 700 continues to operation 706. In operation 706, the system executing the process 700, in an embodiment, does not persist the key in the index and the process 700 is terminated for that particular key (the process may be repeated for additional keys extracted from the data object).

However, if the key is not lookup only, the process continues to operation 710, at operation 710, the system executing the process 700, in an embodiment, determines if the key is indicated as "new." If the key is not indicated as new only, the process 700 continues to operation 712. At operation 712, the system executing the process 700, in an embodiment, persist the key in the index. For example, the system executing the process 700, updates the key repository with the key and information indicating a profile or data object for which the key is associated with. However, at operation 710, if the identifiers associated with the key indicates a new profile or data object, the process 700 continues to operation 714. At operation 714, the system executing the process 700, in an embodiment, determines if the key has been associated with a new profile or data object. For example, a search of the key did not return a matching profile or data object and a new profile or data object was created and associated with the key. At operation 714, if a new profile or data object was created, the system executing the process 700, continues to operation 712 and the key is persisted in the index. However, at operation 714, if the key is not associated with a new profile or data object, the system executing the process 700, continues to operation 706 and the key is not persisted in the index.

Figure 8:
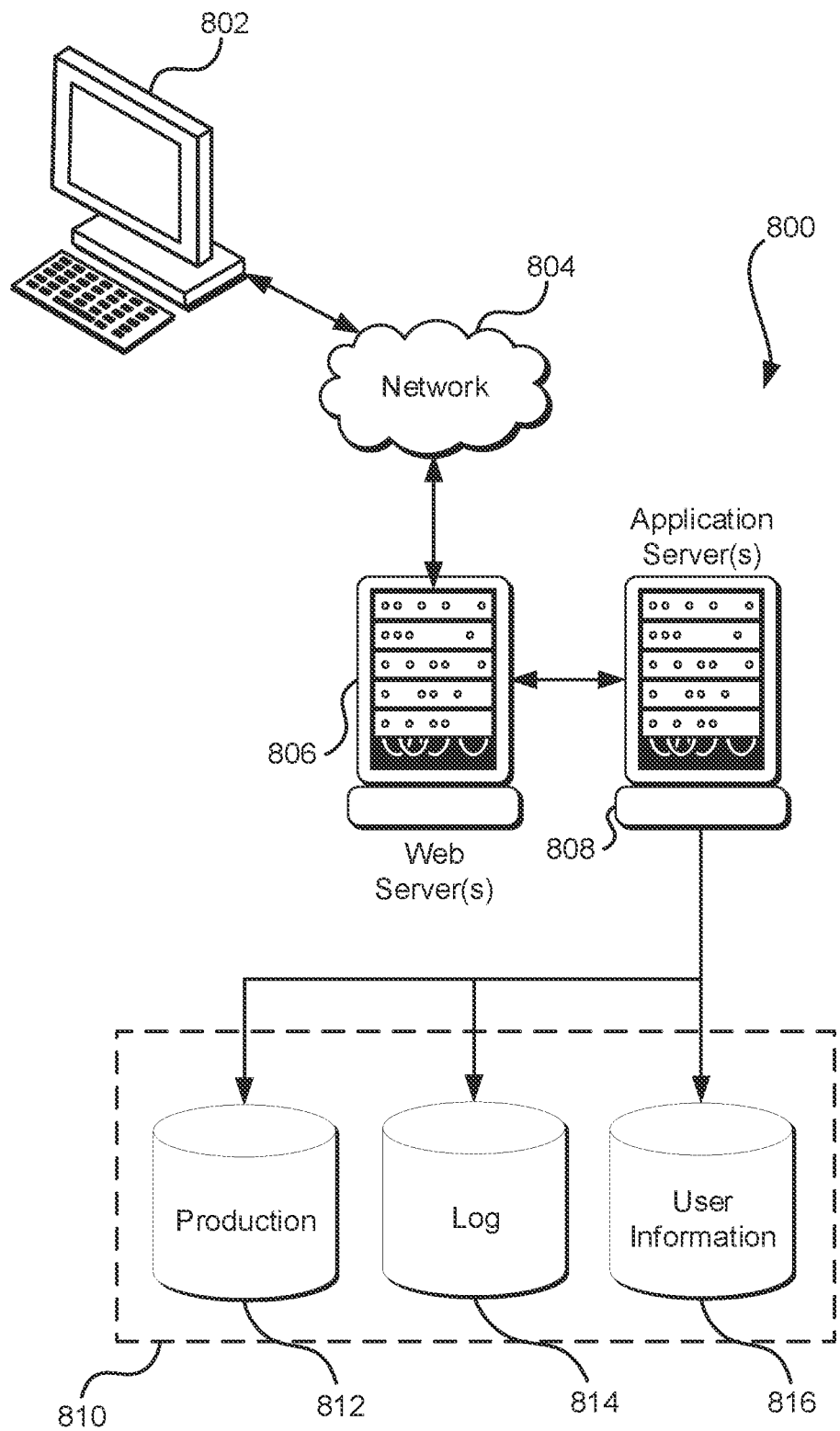
FIG. 8 illustrates a system in which various embodiments can be implemented.

FIG. 8 illustrates aspects of an example system 800 for implementing aspects in accordance with an embodiment. As will be appreciated, although a web-based system is used for purposes of explanation, different systems may be used, as appropriate, to implement various embodiments. In an embodiment, the system includes an electronic client device 802, which includes any appropriate device operable to send and/or receive requests, messages, or information over an appropriate network 804 and convey information back to a user of the device. Examples of such client devices include personal computers, cellular or other mobile phones, hand-held messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 806 for receiving requests and serving content in response thereto, although for other networks an alternative device serving a similar purpose could be used as would be apparent to one of ordinary skill in the art.

In an embodiment, the illustrative system includes at least one application server 808 and a data store 810, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 802 and the application server 808, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 810, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 812 and user information 816, which are used to serve content for the production side. The data store also is shown to include a mechanism for storing log data 814, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 810.

The data store 810, in an embodiment, is operable, through logic associated therewith, to receive instructions from the application server 808 and obtain, update or otherwise process data in response thereto, and the application server 808 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 802. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 800 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 800, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as JavaR, C, C #or C++, or any scripting language, such as Ruby, PHP, Perl, Python or TCL, as well as combinations thereof. In an embodiment, the one or more servers also include database servers, including without limitation those commercially available from OracleR, MicrosoftR, SybaseR, and IBMR as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

In various embodiments described throughout this disclosure, computing resources are configured to perform tasks (e.g., generate data, process data, store data, route messages, transmit data, submit requests, process requests) by loading computer-readable executable instructions into memory that, as a result of execution by one or more processors, cause the one or more processors to execute instructions to perform tasks. In at least one embodiment, a computer system is configured to perform a task through a software application that controls the execution of specific commands, requests, tasks, jobs, and more. A computer system may be configured to execute computer-readable instructions encoded in a software application by loading executable code of the software application into memory and using one or more processors of the computer system to run the executable instructions.

The specification and drawings are, accordingly, to be regarded in an illustrative rather than a restrictive sense. It will, however, be evident that various modifications and changes may be made thereunto without departing from the broader spirit and scope of the subject matter set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the subject matter recited by the claims to the specific form or forms disclosed but, on the contrary, the intention is to cover all modifications, alternative constructions, and equivalents falling within the spirit and scope of this disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate various embodiments and does not pose a limitation on the scope of the claims unless otherwise claimed. No language in the specification should be construed as indicating any non-claimed element as essential to the practice of subject material disclosed herein.

Embodiments of this disclosure are described herein, including the best mode known for carrying out inventive concepts described herein. Variations of those embodiments may become apparent to those of ordinary skill in the art upon reading the foregoing description. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A computer-implemented method, comprising:
    obtaining a data object including a set of fields to be ingested to a profile of a set of profiles maintained by a computing resource service provider, the data object comprising contact information of a subordinate account associated with a primary account of the profile and indicating that the data object is a contact data object type;
    determining, based at least in part on an object mapping which maps a first field of the set of fields to a corresponding field included in the set of profiles, a set of keys included in the data object;
    querying an index to determine that one or more key of the set of keys uniquely identifies the profile, the one or more keys selected according to a hierarchy comprising one or more non-secondary keys and one or more sets of secondary keys, wherein the one or more sets of secondary keys are searched upon a determination that the index does not contain the one or more non-secondary keys;
    generating a standardized contact identifier and associating the standardized contact identifier with at least a subset of fields of the set of fields of the data object based at least in part on the object mapping to generate an instance of a standardized contact data object; and
    associating the instance of the standardized contact data object with the profile by appending the standardized contact identifier to the profile, such that responsive to a request to access the standardized contact identifier, the instance of the standardized contact data object and the profile are made available.

2. The computer-implemented method of claim 1, further comprising:
    generating the standardized contact identifier based on at least one of the set of keys included in the data object;
    determining that the standardized contact identifier is already associated with the profile; and
    responsive to the determining, updating the instance of the standardized contact data object based at least in part on the object mapping.

3. The computer-implemented method of claim 1, wherein the object mapping comprises a template corresponding to a source of the data object, and wherein the computer-implemented method further comprises:
    selecting the template from a number of different templates each corresponding to a different data source based on a source of the data object.

4. The computer-implemented method of claim 1, further comprising;
    obtaining a second data object including a set of fields to be ingested to the profile, the data object indicating that the data object is a one of an asset, a case, or an order object type that is associated with the standardized contact data object;
    determining, based at least in part on a second object mapping, a second set of keys included in the second data object;
    querying the index to determine that one or more key of the second set of keys is associated with the standardized contact data object;
    generating an object identifier and associating the object identifier with at least a subset of fields of the set of fields of the second data object based at least in part on the second object mapping to generate an instance of a standardized data object corresponding to the one of an asset, case, or order object type; and
    associating the instance of the standardized data object with the standardized contact data object by appending the object identifier to the standardized contact data object, such that responsive to a request to access the object identifier, the instance of the standardized data object and the standardized contact data object are made available.

5. A system, comprising:
one or more processors; and
memory that stores computer-executable instructions that are executable by the one or more processors to cause the system to:
    obtain a data object including a set of fields to be ingested to a profile of a set of profiles maintained by a computing resource service provider, the data object indicating a data object type of a plurality of data object types supported by the computing resource service provider;
    generate a standardized data object based on the data object type indicated in the data object using an object mapping associated with the data object type, wherein the object mapping comprises a hierarchy of one or more keys of a set of keys to use in identifying a first profile of the set of profiles to which to associate the standardized data object, the hierarchy comprising two or more ordered groupings of the one or more keys to identify the first profile;
    select a key of the set of keys based on the hierarchy indicated in the object mapping associated with the data object;
    obtain a result of a search of the key within an index; and
    in response to the result indicating the profile includes the key, updating the profile to associate the standardized data object with the profile.

6. The system of claim 5, wherein:
the set of fields comprise contact information;
the data object type comprises a contact object type; and
in response to the result indicating the profile includes the key, the instructions, as a result of being executed by the one or more processors, further cause the system to:
    append an identifier of the standardized data object to the profile, such that responsive to a request to access the standardized data object, the standardized data object, and the profile are made available.

7. The system of claim 5, wherein the profile is associated with a plurality of standardized data objects, individual standardized data objects of the plurality of standardized data objects corresponding to individual members of an account associated with the profile.

8. The system of claim 5, wherein the instructions further comprise instructions, that as a result of being executed by the one or more processors, further case the system to:
associate a second data object with the standardized data object, such that the second data object is accessible through a query of the standardized data object.

9. The system of claim 5, wherein the instructions further comprise instructions, that as a result of being executed by the one or more processors, further case the system to:
associate a second data object with the profile, such that the second data object is accessible through a query of the profile.

10. The system of claim 5, wherein the data object type comprises one of an asset, a case, or an order object type, and wherein in response to the result indicating the profile includes the key, the instructions, as a result of being executed by the one or more processors, further case the system to:
append an identifier of the standardized data object to the profile, such that responsive to a request to access the profile, the standardized data object is made available.

11. The system of claim 5, wherein the first data object is obtained from a first source, and wherein the instructions further comprise instructions, that as a result of being executed by the one or more processors, further case the system to:
obtain a second data object from a second source different from the first source, wherein the second data object includes a second set of fields to be ingested to the profile, the second data object indicating the data object type; and
update the standardized data object based on the data object type indicated in the data object using the object mapping associated with the data object.

12. The system of claim 5, wherein the object mapping indicates a conversion from data included in the set of fields to the standardized data object based on the data object type and a source of the data object.

13. The system of claim 5, wherein the data object is a semi-structured data object and the set of fields is organized based at least in part on a format.

14. A non-transitory computer-readable storage medium storing thereon executable instructions that, as a result of being executed by one or more processors of a computer system, cause the computer system to:
obtain a first data object, to be associated with a profile, from a first source;
convert the first data object to an instance of a first standardized format data object based on a first object mapping of the first standardized format data object, the first object mapping selected from a plurality of object mappings based on the first source;
generate a first key that identifies the instance of the first standardized format data object and associate the first key with the profile;
obtain a second data object, to be associated with the profile, from a second source;
convert the second data object to an instance of a second standardized format data object based on a second object mapping of the second standardized format data object, the second object mapping selected from the plurality of object mappings based on the second source; and
generate a second key that identifies the instance of the second standardized format data object and associate the second key with the profile, such that responsive to a request to access one of the instances of the first standardized format data object or the instance of the second standardized format data object, the profile is made available.

15. The non-transitory computer-readable storage medium of claim 14, wherein:
the first data object indicates a first object type, and
the first object mapping is selected from the plurality of object mappings further based on the first object type.

16. The non-transitory computer-readable storage medium of claim 14, wherein the instructions further comprise instructions that, as a result of being executed by the one or more processors, cause the computer system to responsive to a request to access the profile, the instance of the first standardized format data object and the instance of the second standardized format data object are provided.

17. The non-transitory computer-readable storage medium of claim 14, wherein the instructions further comprise instructions that, as a result of being executed by the one or more processors, cause the computer system to perform at least one of:
generate the first key that identifies the instance of the first standardized format data object at least in part using the first object mapping; or
generate the second key that identifies the instance of the second standardized format data object at least in part using the second object mapping.

18. The non-transitory computer-readable storage medium of claim 14, wherein the first standardized format data object comprises a child profile of the profile.

19. The non-transitory computer-readable storage medium of claim 18, wherein the second data object comprises the first key, and wherein the instructions further comprise instructions that, as a result of being executed by the one or more processors, cause the computer system to associate the second standardized format data object with the child profile, such that the second standardized format data object is provided in response to a query for the child profile.

20. The non-transitory computer-readable storage medium of claim 14, wherein at least one data field of the first data object and the second data object is used to identify the profile.

* * * * *